DATA RECORDING DEVICE AND SYSTEM

Filed Feb. 11, 1965

INVENTOR
ROBERT L. WOOLFOLK
BY [signature]
ATTORNEY

United States Patent Office 3,460,118
Patented Aug. 5, 1969

3,460,118

DATA RECORDING DEVICE AND SYSTEM

Robert L. Woolfolk, Dallas, Tex., assignor to Recognition Equipment, Incorporated Filed Feb. 11, 1965, Ser. No. 431,951
Int. Cl. G11 5/02, 5/82
U.S. Cl. 340—174.1 6 Claims

ABSTRACT OF THE DISCLOSURE

A record device for magnetically storing data having a continuous magnetic recording media surrounded by relatively high reluctance zones. The magnetic recording media is disposed within a groove having a generally square cross-sectional configuration with parallel side walls disposed normal to the face of a planar disk. The disk is fabricated from a material having a high magnetic permeability. A layer of high reluctance insulating material binds the magnetic recording media to one side wall of the generally square cross-sectional groove.

The present invention relates to data storage and retrieval and more particularly relates to a small device for storing data magnetically and to a system for rapidly recording and reproducing the data.

There are many situations in the military and in business where it is advantageous to record a limited quantity of information concerning one particular item of a vast number of similar items on a single record device adapted to be physically stored with the particular item at all times, provided the data can be easily and quickly retrieved in a form compatible with modern high speed data processing systems. For example, in the military it is customary for each individual soldier to carry on his person at all times dog tags reflecting certain basic information. Similar requirements exist for maintenance records for military equipment, and in large businesses having many pieces of equipment and a large number of personnel.

The present invention is concerned with a record device capable of storing larger quantities of information than dog tags in a form which permits the stored information to be changed from time to time and which permits the automatic reproduction of the information as an electric signal compatible with high speed data processing and transmission equipment. This is accomplished by magnetically recording the data on the device in such a manner that it is indestructible by extraneous magnetic fields and by the most abusive environmental conditions. The device may be of such a size, weight and geometric shape that it will not interfere with normal physical activities, and is fabricated from a noncorrosive and abrasive-resistant material. The device is highly economical and is capable of bearing certain basic data visually imprinted thereon to simplify identification without having to electronically read all of the stored data. A system for recording and reproducing the data is also provided wherein the information may be very rapidly reproduced and wherein predetermined portions of the data can be rapidly selected and changes or corrections made in the stored data.

More specifically, the magnetic record device constructed in accordance with the present invention comprises, generally, a disk fabricated from a material having a high magnetic permeability, and which preferably also has low magnetic retentivity. A relatively deep groove is formed in a face of the disk. A continuous magnetic recording media is disposed wholly within the groove and is magnetically and electrically insulated from the reminder of the disk by a layer of insulating material and by the air gap of the groove. The location of the recording media within the deep grooves provides physical protection for the record media and stored data, while the high magnetic permeability of the disk affords preferred paths for extraneous magnetic fields to protect the record media from magnetic erasure.

In accordance with a more specific aspect of the invention, the groove is of sufficient size to form a side wall disposed generally normal to the face of the disk and the magnetic recording media is bonded to the side wall by a layer of insulating material. Such a construction produces a device wherein all extraneous magnetic fields will pass through the body of the disk generally parallel to the face in which the groove is formed, or which will pass through the disk normal to the face on opposite sides of the groove because of the high reluctance of the air gap formed by the groove and the insulating material as compared to that of the material forming the disk.

In accordance with another aspect of the invention, a plurality of concentric grooves are provided in the face of the disk with separate recording media in each, and a plurality of recording and reproducing heads are simultaneously positioned in the grooves for simultaneous readout of the data. Each recorded character may then be represented by a multibit binary word, one bit recorded in each groove, so that all bits in the character can be instantaneously read out.

In another embodiment of the invention, the groove may be a spiral groove formed in the face of the disk and a suitable timing track also provided on the disk so as to provide a serial by bit readout of stored binary data.

Additional aspects, objects and advantages of the invention will be evident to those skilled in the art from the following detailed description and drawings, wherein.

Figure 1:
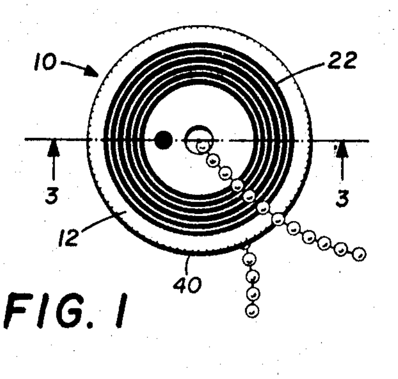
FIGURE 1 is a face view of a record device constructed in accordance with the present invention.

Referring now to the drawings, a recording device constructed in accordance with the present invention is indicated generally by the reference numeral 10 in FIGURE 1. The recording device 10 is preferably comprised of a disk-shaped body 12 fabricated from a material having a high magnetic permeability and low magnetic retention properties. For example, the body 12 may be fabricated from a suitable plastic, aluminum, or other similar material and may be formed by molding, stamping or machining. The disk 12 may conveniently have a pair of parallel planar faces 14 and 16 and is provided with a suitable key means at the center of the disk so that the disk may be rotated about its central axis. For example, the central key means may comprise a bore 18 extending through the center of the disk, and a recess 20 offset from the bore 18.

Figure 2:
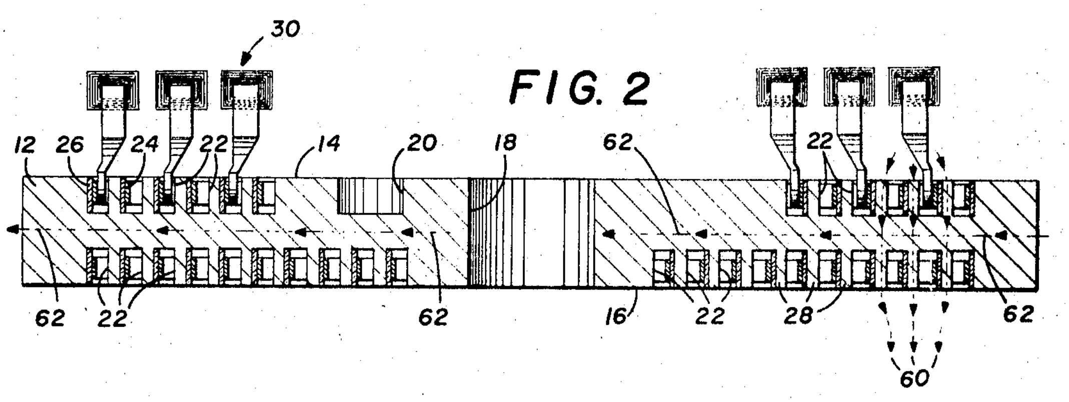
FIGURE 2 is a sectional view taken substantially on lines 2—2 of FIGURE 1 which also illustrates a plurality of magnetic recording and reproducing heads in operative position with respect to the disk.
Figure 3:
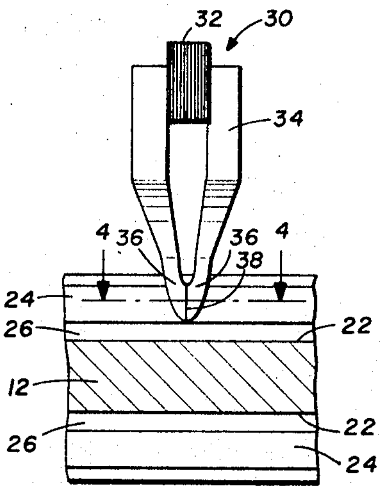
FIGURE 3 is a secional view taken substantially at right angles to the sectional view of FIGURE 2.
Figure 4:
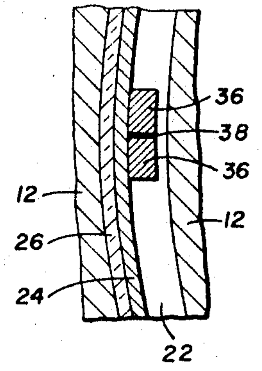
FIGURE 4 is a sectional view taken substantially on lines 4—4 of FIGURE 3.

A plurality of concentric grooves 22 are formed in the face 14. If desired for additional storage capacity, a number of the grooves 22 may be formed in the face 16. It will be noted that the grooves 22 in the opposite faces 14 and 16 are preferably aligned so that magnetic flux may pass in a straight line through the disk between the grooves 22. Each of the grooves 22 is preferably substantially rectangular in cross section as best illustrated in FIGURE 2 so as to provide at least one side wall disposed generally normal to the respective face of the disk 12. A suitable continuous magnetic record media 24 is bonded to one wall of each of the grooves by a layer of suitable insulating material 26. The record media 24 may be any conventional magnetic recording material, such as the various well-known magnetic oxide coatings, and the insulating material 26 may be any suitable material, such as an air epoxy bonding phenolic insulator, for magnetically and electrically insulating the recording media 24 from the body 12 of the disk, and may also serve as the bonding agent to secure the recording media in place. Of course, the recording media 24 and the insulating material 26 should be selected so as to withstand the various adverse environmental conditions to which the device may be subjected, such as temperature extremes and deleterious fluids.

Alpha-numeric data, or other suitable data, may be recorded on the recording media 24 in the respective grooves 22 by a plurality of magnetic recording and reproducing heads such as illustrated generally by the reference numeral 30. Each recording and reproducing head 30 may comprise a coil 32 wound about a conventional core 34. The ends 36 of the core are so sized and shaped as to extend into the grooves 22 and position the gap 38 between the ends adjacent to the recording media 24. As illustrated, the gap 38 is disposed transversely of the recording media 24, but may be oriented in any suitable manner.

In accordance with an important aspect of the invention, a plurality of magnetic recording and reproducing heads 30 are provided for the simultaneous read-out of data recorded on the separate record media 24 in the individual grooves 22. One of the recording media 24 on each side of the disk 12 may carry recorded clock pulses to indicate when a binary bit should occur adjacent each of the recording heads so that, for example, the absence of magnetic flux at that point may indicate a zero, and the presence of magnetic flux at that point may indicate a one. Or, the peripheral edge of the disk may be provided with a plurality of peripherally-spaced grooves 40 as illustrated in FIGURE 1. Such grooves will produce pulses in a magnetic pickup head positioned adjacent the edge of the disk by changing the magnetic characteristics adjacent the gap of the pickup head.

Figure 5:
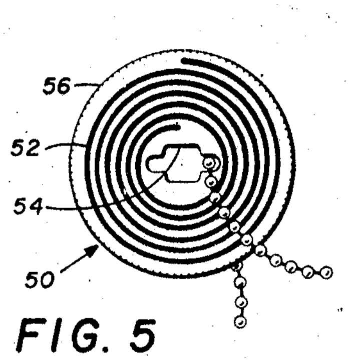
FIGURE 5 is a side view of an alternative embodiment of the record device constructed in accordance with the present invention.

Referring now to FIGURE 5, an alternative embodiment of the recording device is indicated generally by the reference numeral 50. The device 50 is substantially identical to the device 10 except that a single spiral groove 52 is provided in one or more of the faces of the disk, rather than the concentric grooves 22. One continuous magnetic recording media is positioned in the groove 52 and is bonded to and spaced from one wall of the groove 52 substantially as described in connection with the recording media 24 of the device 10. The recording device 50 has a polysided keyway 54 to provide a means for driving the recording disk. A plurality of peripherally-spaced grooves 56 are provided in the peripheral edge of the disk to produce a clock pulse or reference pulse to indicate the location of each bit as heretofore described.

In the record device 50, a single recording and reproducing head, such as one of the recording and reproducing heads 30, follows the record media in the groove 52 to record or reproduce data stored thereon. The data is therefore read out serially by bit, and, in order to read out a character recorded as a binary number in a plurality of bit positions, the disk must be rotated past all bit positions of the character.

In accordance with an important aspect of the invention, the data recorded on the magnetic recording media 24 of the device 10, as well as that stored on the similar recording media in the groove 52 of the device 50, is virtually indestructible by extraneous magnetic fields. When the device 10, or the device 50, is subjected to an extraneous magnetic field normal to the faces 14 and 16, the magnetic flux passes through the low reluctance paths formed by the material from which the body 12 of the disk is fabricated, rather than through the relatively high reluctance zones around each recording media formed by the air gap of the grooves and the insulating material 26. The flux path normal to the faces 14 and 16 is therefore represented by the arrows 60. When the flux of extraneous magnetic fields is parallel to the faces 14 and 16, the flux tends to concentrate in the low reluctance path through the center of the body 12 as represented by the arrows 62. Thus, each of the magneitc recording means 24 is magnetically isolated by the high reluctance of the air gap and the insulating layer 26. Further, each recording media is recessed substantially below the respective face 14 or 16 so as to be well shielded from any mechanical damage.

Although preferred embodiments of the invention have been described in detail, it is to be understood that various changes, substitutions and alterations can be made therein without departing from the spirit and scope of the invention as defined by the appended claims.

What is claimed is:

1. A device for magnetically storing data comprising:
- a body fabricated from a material having a high magnetic permeability,
- a groove having a generally square cross-sectional configuration with generally parallel side walls disposed normal to the face of said body, and
- a continuous magnetic recording media surrounded by relatively high reluctance zones and bonded within the grove to one side wall by a layer of high reluctance insulating material to be electrically and magnetically insulated from the remainder of the body.

2. The device defined in claim 1 wherein the groove is a spiral groove.

3. The device defined in claim 1 wherein a plurality of concentric grooves are provided in the face.

4. The system for magnetically recording data which comprises:
- a body fabricated from a material having a high magnetic permeability and having a generally planar face,
- an elongated groove having a generally square cross-sectional configuration with generally parallel side walls disposed normal to the face of said body,
- an elongated magnetic recording media surrounded by relatively high reluctance zones and bonded within the groove to one side wall by a layer of high reluctance insulating material to be electrically and magnetically insulated from the body, and
- a magnetic recording and reproducing head movable relative to the recording media for insertion in the groove to record on and reproduce from the record media.

5. The system defined in claim 4 wherein:
- there are a plurality of generally concentric grooves formed in the face of the body with a recording media disposed in each groove, and
- there is a magnetic recording and reproducing head for insertion in each groove for simultaneously recording on and reproducing from the recording media.

6. The system defined in claim 4 wherein:
the groove is a spiral groove and the body is further characterized by a reference pulse track containing a reference pulse for each time the recording and reproducing head passes a predetermined position on the groove.

References Cited

UNITED STATES PATENTS

| | | | |
|---|---|---|---|
| 2,265,879 | 12/1941 | Thurm | 179—100.2 |
| 2,581,765 | 1/1952 | Mann et al. | 274—41.4 |
| 2,594,893 | 4/1952 | Faus. | |
| 2,819,186 | 1/1958 | Franck | 274—41.4 XR |
| 2,857,476 | 10/1958 | Kleiber. | |

| | | | |
|---|---|---|---|
| 3,065,461 | 11/1962 | Aronis. | |
| 3,070,800 | 12/1962 | Brown et el. | |
| 3,130,110 | 4/1964 | Schmidt | 161—42 |
| 3,195,118 | 7/1965 | St. Clair. | |

FOREIGN PATENTS

| | | |
|---|---|---|
| 1,059,681 | 6/1959 | Germany. |

MAYNARD R. WILBUR, Primary Examiner

S. SHEINBEIN, Assistant Examiner

U.S. Cl. X.R.

179—100; 235—61; 274—41